US005546579A

United States Patent [19]
Josten et al.

[11] Patent Number: 5,546,579
[45] Date of Patent: Aug. 13, 1996

[54] PAGE REFRESHING PROCEDURE USING TWO LOCKING GRANULARITIES TO ENSURE CACHE COHERENCY IN A MULTISYSTEM DATABASE PROCESSING ENVIRONMENT HAVING A HIGH-SPEED SHARED ELECTRONIC STORE

[75] Inventors: Jeffrey W. Josten, Morgan Hill; Tina Mukai, San Jose; Inderpal S. Narang, Saratoga; James Z. Teng, San Jose, all of Calif.

[73] Assignee: International Business Machines Corporation, Armonk, N.Y.

[21] Appl. No.: 236,798

[22] Filed: May 2, 1994

[51] Int. Cl.$^6$ .................................................. G06F 13/364
[52] U.S. Cl. .................. 395/600; 395/650; 395/183.14; 364/134; 364/DIG. 1; 364/243.41; 364/935.43; 364/DIG. 2
[58] Field of Search ................................. 395/600, 650, 395/575, 725, 700

[56] References Cited

U.S. PATENT DOCUMENTS

| | | | |
|---|---|---|---|
| 4,096,561 | 6/1978 | Trinchieri | 395/650 |
| 4,965,719 | 10/1990 | Shoens et al. | 395/650 |
| 5,247,672 | 9/1993 | Mohan | 395/650 |
| 5,276,835 | 1/1994 | Mohan et al. | 395/425 |
| 5,276,872 | 1/1994 | Lomet et al. | 395/600 |
| 5,280,611 | 1/1994 | Mohan et al. | 395/600 |
| 5,287,473 | 2/1994 | Mohan et al. | 395/425 |
| 5,287,521 | 2/1994 | Nitta et al. | 395/725 |
| 5,333,303 | 7/1994 | Mohan | 395/575 |

OTHER PUBLICATIONS

C. Mohan, "Aries: A Transaction Recovery Method Supporting Fine–Granularity Locking and Partial Rollbacks Using Write–Ahead Logging", Research Report RJ 6649, Rev. Nov. 2, 1990, International Business Machines Corporation.

C. Mohan & I. Narang, "Recovery and Coherency–Control Protocols for Fast Intersystem Page Transfer and Fine–Granularity Locking in a Shared Disks Transaction Environment", Research Report RJ 8017, Mar. 15, 1991, International Business Machines Corp.

*Primary Examiner*—Thomas G. Black
*Assistant Examiner*—C. Pham
*Attorney, Agent, or Firm*—Baker, Maxham, Jester & Meador

[57] ABSTRACT

A method for ensuring data coherence while detecting whether the locally cached copy of a data page is invalid and responsively refreshing the locally cached page from a Shared Electronic Store (SES) in a multisystem shared disk environment. Locally cached data pages may become invalid in a multisystem shared disk environment because of transactions executed by other systems for the common database. Thus, whenever a transaction in a database management system (DBMS) instance desires to read or update a record in a locally cached data page, the DBMS must first verify validity for the locally cached copy and, for stale or invalid copies, must re-read and re-register the latest version in the SES. This invention provides a procedure for the necessary verification and refreshing steps that relies on page latching to serialize the combination of local multiuser and global multisystem activities. The procedure of this invention supports both record and page locking granularities.

15 Claims, 9 Drawing Sheets

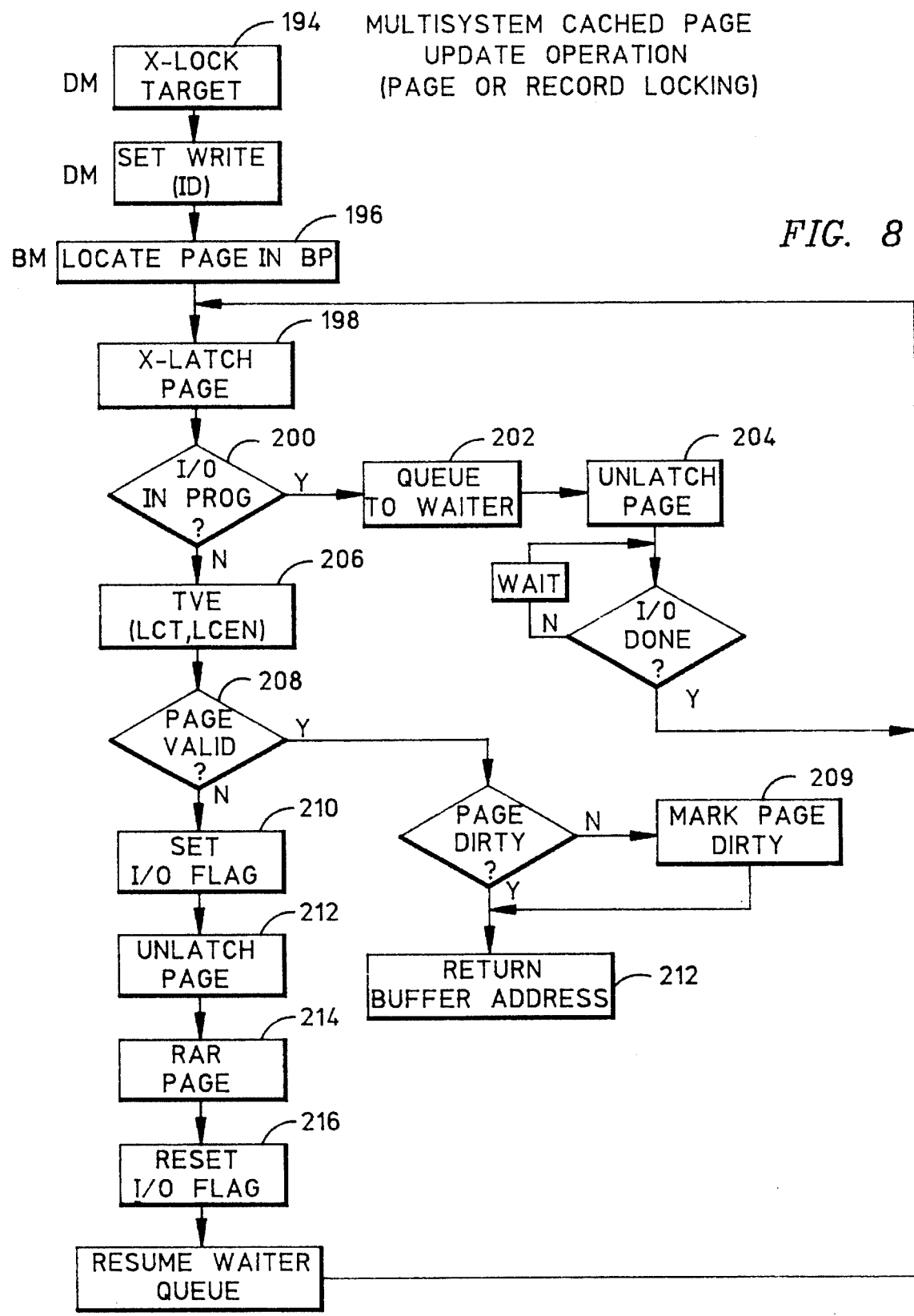

PAGE REFRESHING PROCEDURE USING TWO LOCKING GRANULARITIES TO ENSURE CACHE COHERENCY IN A MULTISYSTEM DATABASE PROCESSING ENVIRONMENT HAVING A HIGH-SPEED SHARED ELECTRONIC STORE

CROSS-REFERENCE TO RELATED APPLICATION

This application is related by common inventorship and subject matter to copending U.S. patent application Ser. No. 08/236,284 entitled "EFFICIENT DESTAGING OF UPDATED LOCAL CACHE PAGES FOR A TRANSACTION IN A MULTISYSTEM AND MULTIPROCESS DATABASE MANAGEMENT SYSTEM WITH A HIGH-SPEED SHARED ELECTRONIC STORE" filed on even date herewith, assigned to the Assignee hereof and entirely incorporated herein by this reference.

BACKGROUND OF THE INVENTION

1. Field of the Invention

This invention relates generally to system complexes embracing multiple concurrent multi-user database processing systems coupled to a shared external database store and particularly to a method for refreshing a stale Local Cache Buffer (LCB) data page that serializes stale page detection with re-reading of the fresh page from shared external nonvolatile store (NVS) to maintain multisystem cache coherency under both record and page locking granularities.

2. Description of the Related Art

Modern data processing system architecture provides for multiple Data Base Management System (DBMS) instances, each servicing many concurrent users, for processing a plurality of databases in a system complex (sysplex) that includes a plurality of Central Processing Complexes (CPCs) each having Local Cache Buffers (LCBs) commonly connected to a Shared Electronic Store (SES) that includes nonvolatile storage (NVS) means for storing data shared by the CPCs. The SES serves to "cache" data pages from a shared external store that includes stable Direct Access Storage Devices (DASDs) and the like. Because DASD data transfers are slowed by mechanical actuator latency, the SES caching function can significantly improve external store performance while offering complete data stability by virtue of its nonvolatile character. Such a multisystem environment is described in copending U.S. patent application Ser. No. 08/860,805 filed on Mar. 30, 1992 by D. Elko et al. as "SYSPLEX SHARED DATA COHERENCY METHOD AND MEANS", (Assignee Docket PO9-91-052), assigned to the Assignee hereof and entirely incorporated herein by this reference.

In the database sysplex described by Elko et al., wherein a plurality of independently-operating CPCs share data, global locking imposed by a global locking manager (GLM) is required to maintain data coherency within the different CPCs. The data coherency problem arises because sharing data among a proliferation of processors may create multiple inconsistent data page copies because of multiple paths to the data and because of opportunities to locally modify the data. The above-cited Elko et al. patent application describes a sysplex architecture in which each CPC operates with a storage hierarchy that may include a private high-speed hardware cache in each Central Processing Unit (CPU) of a CPC, a shared hardware cache accessible to all of the private CPU caches within a single CPC, a main store (MS) shared by all CPUs in a single CPC, a hardware storage area (HSA) within each CPC that is associated with the local MS but excluded from MS address space, an expanded store (ES) in each CPC coupled to the local MS and a DASD director coupled to the local MS for controlling DASD resources collocated with a single CPC.

A multiprocessor sysplex includes a plurality of such CPCs, where the various DASD directors operate to control data flow between all CPCs and all DASD resources so that any CPC can access any record on any DASD, including records written by other CPCs in the sysplex. Each CPC has one or more operating systems, where local CPC resources are logically partitioned among the operating system plurality. Within each CPC, the MS/ES storage combination is considered to be a single random access store internal to the CPC, where data pages in MS are backed by stable pages in ES and DASD in the usual manner. Some or all of the CPCs in a sysplex are connected to a Shared Electronic Store (SES), each by a channel connected to the corresponding local MS. In a hardware sense, a SES may be considered to be a large random access memory (RAM) that may be used (but need not be) in common by some or all CPCs connected to the SES. Connected CPCs may use the SES to store shared data records and pages on a temporary or semi-permanent basis. Thus, SES may be considered as a component of the storage hierarchy in the sysplex, having a hierarchy level common to all connected CPCs that roughly corresponds to the local ES level within each CPC.

A fundamental feature of this sysplex architecture is the use of SES as a high-speed cache for data normally stored in the sysplex common DASD resource even though the CPC-SES-DASD physical connection may not be organized as a direct hierarchy. Any CPC in the sysplex can access a record much faster from SES than it can from common DASD storage because the SES hardware speed is much faster than DASD access speed. Because SES includes nonvolatile storage (NVS) and a cache cross-invalidation capability, a DBMS instance can perform fast writes of modified ("dirty") LCB data pages to the SES and thereby satisfy the "force-to-stable-storage" requirement necessary for releasing global transaction locks. The modified data pages in SES may then be asynchronously destaged to DASD without holding up the release of global transaction locks, thereby increasing processing efficiency without compromising the normal database recovery features that rely on "stable storage" of updated data pages.

Practitioners have proposed other strategies for reducing global locking overhead in a multiprocess sysplex. For instance, in U.S. patent application No. 07/869,267 now U.S. Pat. No. 5,408,653 filed on Apr. 15, 1992 as "EFFICIENT DATABASE ACCESS USING A SHARED ELECTRONIC STORE IN A MULTISYSTEM ENVIRONMENT WITH SHARED DISKS", commonly assigned to the Assignee hereof and entirely incorporated herein by this reference, Josten et al. describe a protocol whereby, subject to a requirement for no intersystem read-write interest in the subject database, a single DBMS instance employs a "no-force-at-commit" protocol permitting it to write database updates to external storage asynchronously (e.g., in "batch" mode) after releasing global locks during transaction-commit processing. This flexibility improves overall transaction response time and reduces the global lock hold time, improving concurrency. However, the requirement for intersystem cache "coherency" requires a local buffer manager (BM) within a CPC to enforce a "force-at-commit" protocol whenever it detects intersystem read-write interest in the database being processed. The force-at-commit policy requires the DBMS instance to force (write) all modified (dirty) LCB data pages to stable external storage before releasing the committing transaction locks on those data pages. Moreover, before the global locks are released, all other "interested" systems must be notified of the forced data page updates through a cross-invalidation protocol controlled by the SES element of the sysplex. The Write-Ahead Logging (WAL) protocol is employed within each DBMS to ensure full database recovery from any conceivable combination of hardware failures.

The above-cited Elko et al. patent application describes a detailed system for ensuring data coherency in the Buffer Pool (BP) made up of the combination of all local cache buffers (LCBs) for a plurality of DBMS instances in all CPCs. Their method relies on data page storage and/or registration within SES of all LCB data page copies, among other important elements. To prevent multiple-version contamination (loss of coherency), any DBMS instance in a CPC wanting to access (read or write) a record in the sysplex common DASD pool must first register the data page containing such record in a SES directory and preferably read the data page from the SES cache if it exists there. Because each DBMS instance operates to maintain local cache coherency independently within the sysplex, the SES imposes global coherency controls that operate additionally to such internal coherency controls. SES causes each DBMS instance in a CPC to maintain Local Validity Vectors (LVVs) within the HSA of each CPC, each LVV corresponding to a LCB Of a DBMS. Each CPC sets a vector bit from a valid ("fresh") state to an invalid ("stale") state responsive to a SES message showing a change in the latest global version of the corresponding data page registered with SES, as part of the cross-invalidation procedure.

For instance, a DBMS instance in a CPC making the change to a record in a data page writes the changed page to SES. SES then consults a table to determine which other DBMS instances in other CPCs are holding a copy of the same data page in their LCBs and sends a message to each holding CPC to reset the corresponding bit in the LVV held in the HSA of the holding CPC. Importantly, because the HSA exists outside of the MS address space within the CPC, special hardware instructions are required to set, reset and test the LVV. If SES causes the CPC to set any vector bit to the invalid state in the CPC's HSA, the CPC program in execution is not disturbed or alerted in any way by such setting when it happens. CPC programming continues without interruption or notice. However, this means that each CPC program is independently responsible for testing the LVV bit state when necessary to determine if any data page invalidation has occurred. More importantly, the CPC program is also responsible for "serializing" such validity testing with other page operations, such as the refreshing of an invalid data page in LCB, to ensure that the subsequent operation actually reflects the supposed page "freshness" determined by the LVV bit test.

Each CPC controls the state of each LVV bit, corresponding to a data page in LCB, and normally sets this bit to "invalid" responsive to a message from SES signaling that an update to the same data page by some other CPC has made the LCB copy stale. Before permitting a transaction to read or write to a LCB data page, the CPC application programming tests the LVV validity bit and, responsive to finding an invalid setting, "refreshes" the LCB data page copy by sending a message to SES asking for the latest copy, which also results in registering with SES that the "fresh" LCB copy is cached in a DBMS instance in a CPC. It can be readily appreciated that the related message flow between each CPC and the SES must be serialized to avoid loss of data consistency of a cached data page in different instances of a DBMS.

For instance, because it is possible for a SES-supported CPC to receive and execute a cross-invalidate command against a designated LCB page after interest in the page has been registered at the SES but before the response to the read command under which the registration took place is received, the update to the LVV by the CPC application programming must be serialized with execution of the SES command. The application programming must ensure that the LVV is not set to "valid" (without a new refresh) after it is set to "invalid" by an intervening cross-invalidate command. Otherwise, invalidation of a LCB data page may be undetected and result in the loss of data integrity.

A problem arises because the LVV bit is reset to "valid" before the related "refresh" (read-and-register) request is sent by CPC to SES, a procedural requirement imposed to ensure that the local LVV bit entries never cause a data integrity problem within the CPC arising from "missed" cross-invalidate commands. The alternative method of resetting the LVV bit to "valid" after reading the page from SES is unacceptable as it will destroy the effect of an intervening cross-invalidate command from SES. By first setting the bit to "valid", the CPC ensures that an intervening cross-invalidate command from SES received during the refresh cycle is read and understood.

While this restriction ensures data coherency across the multisystem, it introduces a separate problem for concurrent transactions within a single DBMS instance in the CPC. That is, after the LVV bit is set to "valid" but before the completion of the data page refresh request is sent to SES, a second concurrent (local) transaction may ask for access to the same data page in LCB. When this second transaction queries the LVV bit, it erroneously finds the stale LCB data page copy to be "valid". When the first local transaction holds an exclusive page lock, this situation is not a problem. However, for record locking granularity or shared page locking, the second local transaction is not blocked from access to the same data page.

These cache coherence control problems do not exist in single multi-user systems. They arise as a result of the improved multisystem shared disk environment. The serialization and local coherence control procedures known in the art for preventing multiple-version data page contamination disadvantageously impose efficiency burdens that tend to negate much of the efficiency advantage offered by the sysplex multisystem shared external store architecture. The related unresolved problems and deficiencies are clearly felt in the art and are solved by this invention in the manner described below.

SUMMARY OF THE INVENTION

This invention introduces local buffer page latches with page locking in a multisystem shared disk environment to serialize Local Validity Vector (LVV) verification and SES read and register (RAR) refresh processing. Page latching is introduced for both page and record locking granularities to force serialization of local Test Vector Entry (TVE) processing (to read the LVV bit corresponding to the Local Cache Buffer (LCB data page) and global SES Read-And-Register (RAR) processing (to refresh the LCB data page). For page locking granularity, the page latches introduced by the procedure of this invention may also be used to support unlocked read processing in the local DBMS.

It is an object of the method of this invention to guarantee database coherency across multiple processing systems coupled by a shared external store through a single dual-granularity procedure for serializing local page validity testing and global page refreshing and registration.

It is an advantage of the procedure of this invention that introducing page latching for both page and record locking granularities provides a single procedure to support either locking protocol for the database. It is another advantage of the procedure of this invention that, for LCB data page updates, page latching eliminates the test of a "write-intent-count" field in the Buffer Control Block (BCB) for the LCB data page.

The foregoing, together with other objects, features and advantages of this invention, will become more apparent when referring to the following specification, claims and the accompanying drawing.

BRIEF DESCRIPTION OF THE DRAWING

For a more complete understanding of this invention, reference is now made to the following detailed description of the embodiments as illustrated in the accompanying drawing, wherein:

FIG. 1C represents a single computer processor complex (CPC);

FIG. 8 is a flow chart illustrating the cached page update procedure of this invention for either page or record locking granularities in a multisystem environment.

DETAILED DESCRIPTION OF THE PREFERRED EMBODIMENTS

The Multisystem Sysplex Environment

Figure 1A:
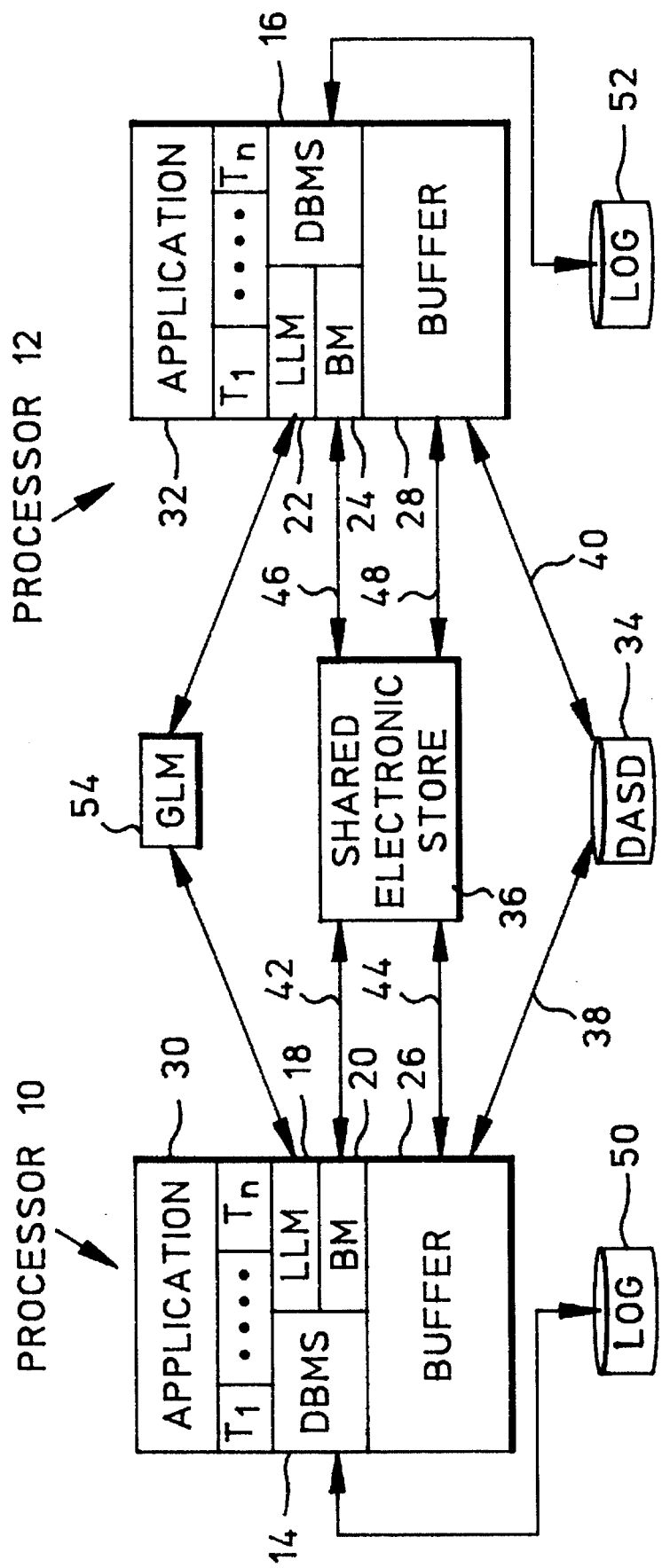
FIGS. 1A–1C show functional block diagrams illustrating the multisystem environment for which the procedure of this invention is applicable, where

FIG. 1A provides a functional block diagram exemplifying the multisystem environment within which this invention operates. In FIG. 1A, two processors 10 and 12 are shown. Each may include, for example, an IBM System/390 central processor unit (CPU) having an IBM MVS operating system. Each CPU executes a database management system (DBMS) 14 and 16. DBMS 14 includes a local lock manager (LLM) 18 and a buffer manager (BM) 20. Similarly, DBMS 16 includes LLM 22 and BM 24. BMs 20 and 24 respectively maintain local buffers 26 and 28 for storage of data. DBMSs 14 and 16 each respectively serve at least one application exemplified by applications 30 and 32, which respond to the requirements of application-generated transactions for reading and updating data maintained in one or more databases stored on stable external storage (DASD) 34. DASD 34 may include separate DASD resources collocated with each processor 10 and 12. Data is stored in DASD 34 in data blocks, herein denominated "data pages", each including one or more data records.

Processors 10 and 12 each access both internal storage in the form of local buffers 26 and 28, respectively, and external storage in the form of DASD 34 and a high-speed, store-in cache memory herein denominated a "shared electronic store (SES)" 36. DASD 34 is the ultimate stable repository of the one or more databases, with data pages being selectively moved from DASD 34 to buffers 26 and 28 over the data paths 38 and 40, respectively. Data paths 38 and 40 are conventional input/output (I/O) couplings between CPU operating systems and DASD 34. SES 36 is provided for store-in caching of data pages that are brought into buffers 26 and 28 for transaction processing. SES 36 is written to and read from over high-speed links such as fiber-optic links 42, 44, 46 and 48, which connect SES 36 to processors 10 and 12. SES 36 includes control logic (not shown) that is invoked by issuing commands from BMs 20 and 24 over links 42, 44, 46 and 48, respectively. DBMSs 14 and 16 also maintain respective logs 50 and 52 for recovery purposes in the event of hardware failure. Log-based database recovery is a well-known feature of database systems whose accommodation of the method of this invention may be readily appreciated with reference to above-cited fully-incorporated references and to IBM Report RJ-6649 (Rev. 11/2/90) by C. Mohan et al. entitled "ARIES: A Transaction Recovery Method Supporting Fine-Granularity Locking and Partial Rollbacks Using Write-Ahead Logging", which is fully incorporated herein by this reference.

Global serialization against same data and data coherency with respect to the plurality of processors shown in FIG. 1A is ensured by a global lock management system embodied in a global lock manager (GLM) 54 with connections to each LLM 18 and 22. GLM 54 may be an autonomous component that is executed in its own CPU or in a coprocessing mode in the CPU of one of the DBMSs and GLM 54 may communicate with LLMs 18 and 22 by well-known message passing or mail-drop methods.

Figure 1B:
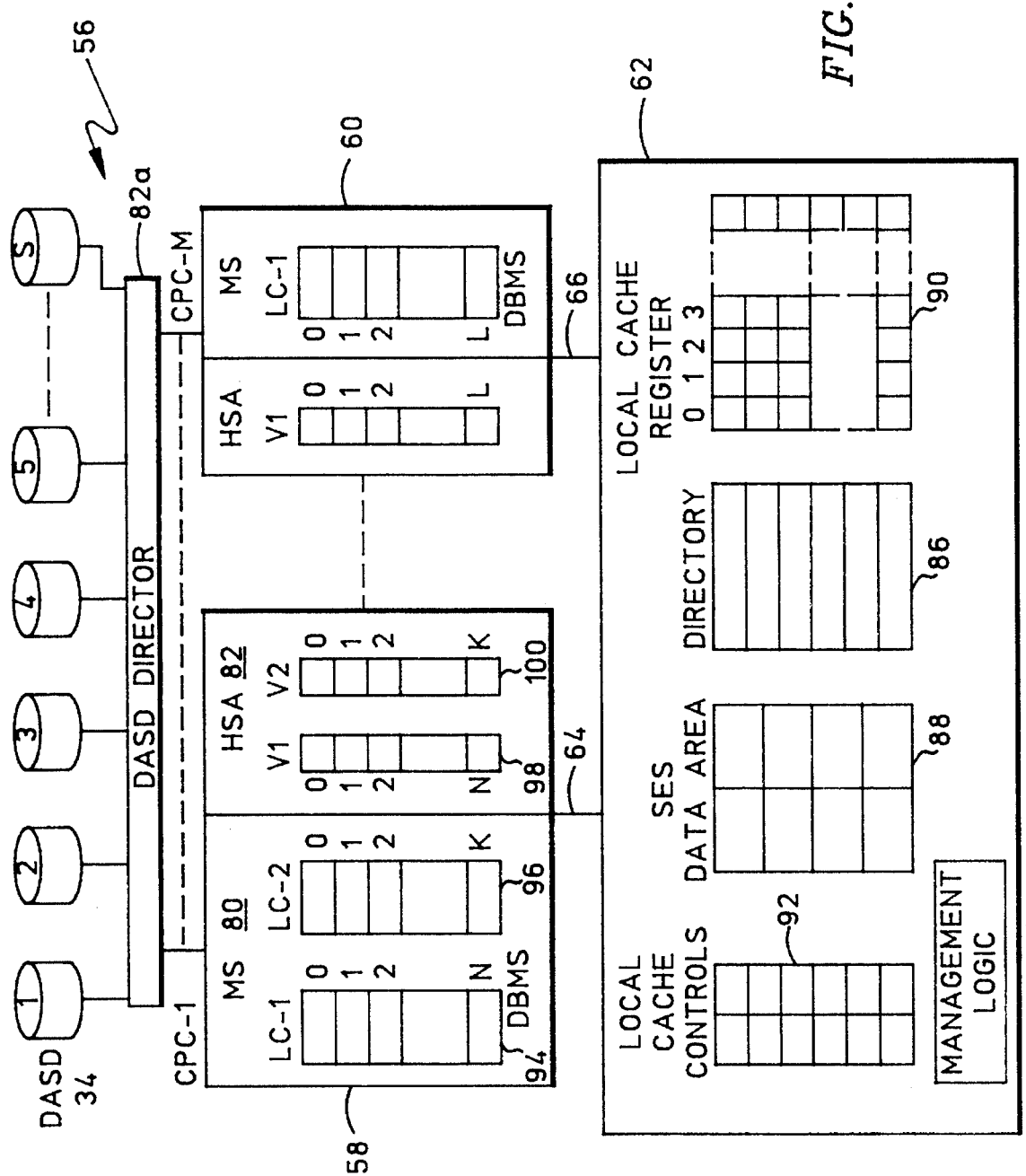

FIG. 1B shows another exemplary representation of the multiprocessor system discussed above in connection with FIG. 1A, showing a system complex (sysplex) 56 suitable for implementation of the method of this invention. Sysplex 56 includes a plurality M of computer processing complexes (CPCs), from CPC 58 (CPC-1) to CPC 60 (CPC-M), which represent any number of CPCs from one to a large number, all being connected to one or more shared electronic storage (SES) devices, of which one SES device 62 is shown. CPC 58 has one or more concurrent operating systems and its resources are logically partitioned among plural operating systems. Intersystem channels (ISCs) 64 and 66 connect SES 62 to CPCs 58 and 60, respectively. ISCs 64 and 66 respectively communicate signals to and from microcode and hardware in CPCs 58 and 60.

Figure 1C:
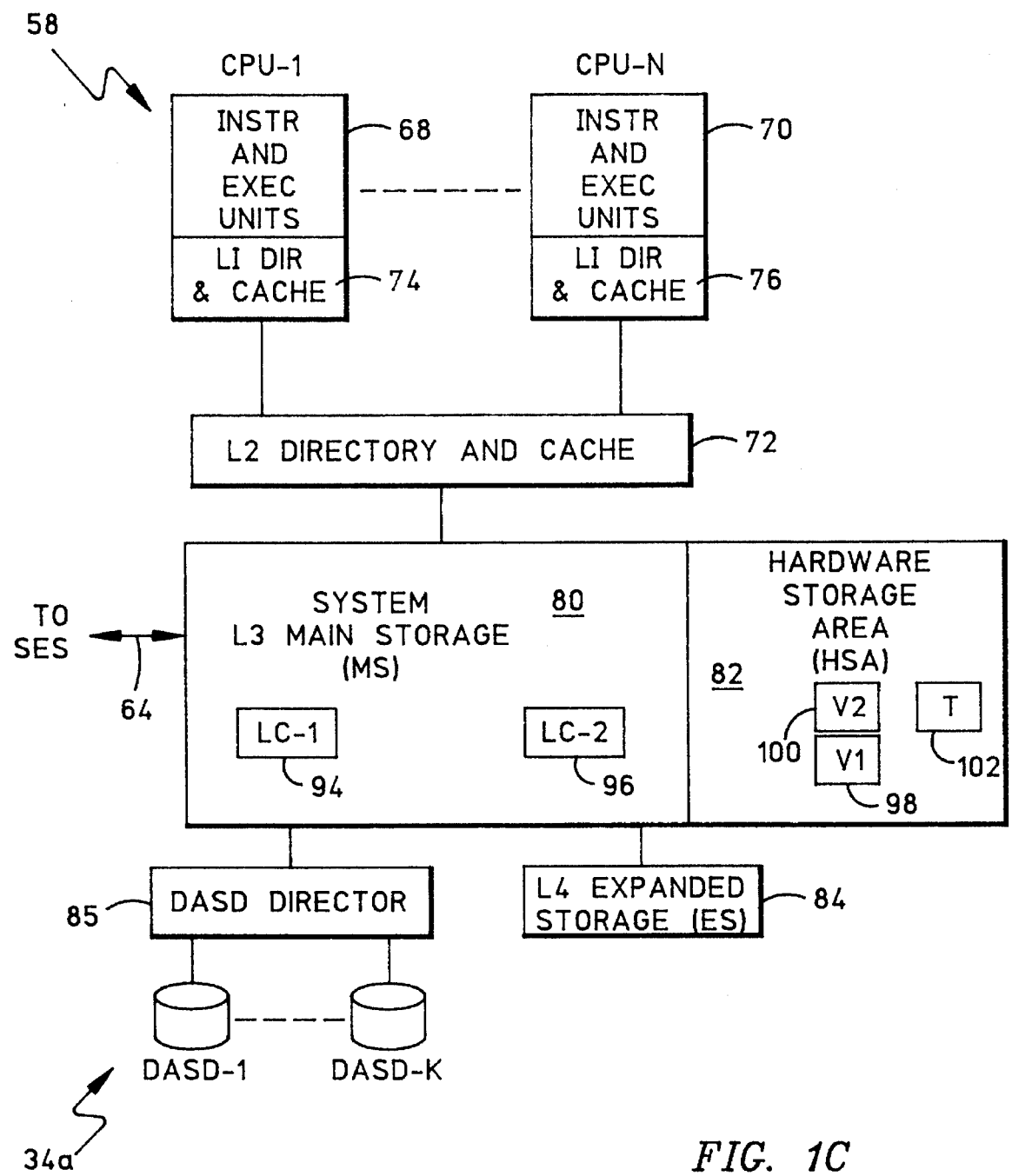

FIG. 1C shows CPC 58 in more detail. CPC 58 is reminiscent of processor 10 in FIG. 1A, which may be a multiprocessor such as the commercial IBM ES/9000 model 900 (designed according to the IBM ESA/390 architecture specified in the Enterprise Systems Architecture Principles of Operations (POP), IBM Document No. SA22-7201-00, incorporated herein by reference in its entirety.)

Each CPC in sysplex 56 operates with a storage hierarchy, which for example may include a private high-speed hardware cache in each CPU of CPC 58, exemplified by CPU 68

(CPU-1) and CPU 70 (CPU-N). Also, the storage hierarchy may include a level-2 shared hardware cache 72 accessible to all of the level-1 private processor caches, exemplified by caches 74 and 76. The hierarchy may also include a level-3 main storage (MS) 80 shared by all CPUs in CPC 58, a hardware storage area (HSA) 82 associated with MS 80 but not having MS 80 addressability, and a level-4 expanded store (ES) 84. However, DASD 34a is grouped by DASD controls, exemplified by DASD director 85, that allow any CPC in sysplex 56 to access any DASD in the DASD group 34a.

As used herein, the storage combination of MS 80 and ES 84 may be considered as a single random access storage unit internal to CPC 58, because the pages in MS 80 are backed by ES 84 and DASD 34a. ES and DASD pages can be swapped by applications using instructions, such as "page in/page out" or "move page" to quickly move pages back and forth between MS 80 and ES 84 which eliminates need for distinguishing between records in ES 84 or MS 80 within a single-user operation.

The physical connection 64 between SES 62 and CPC 58 should be a high-speed optical channel as mentioned above. In a hardware sense, SES 62 may be considered as a large random access memory (RAM) available for common use by all CPCs connected to SES 62. The connected CPCs may use SES 62 to store shared data records and files on a temporary or semipermanent basis. Hence, SES may be considered to be a component of the storage hierarchy in the system, having a hierarchy level common to all CPCs attached to the SES that roughly corresponds to the level-4 ES 84 in CPC 58.

A fundamental feature of sysplex 56 is that SES 62 is used as a high-speed cache for data pages normally stored in the sysplex common DASD 34. Although the CPC/SES/DASD physical connections may be organized as a direct hierarchy, any CPC in sysplex 56 can access a record much faster from SES 62 than it can from common DASD 34. That is, a data element or record can be quickly accessed in SES 62 without the electro-mechanical delays found with DASD, such as waiting for head movement between tracks and waiting for a track spin to reach a requested DASD record.

Referring to FIG. 1B, SES cache 62 includes a directory 86, a data area 88, a local cache register 90 and the cache controls 92. Each valid directory entry in a SES cache contains a name of a data element (page) registered in SES by any of the DBMS instances in the attached CPCs. SES may or may not contain a copy of the data in the registered element. The SES registered name is also the name of one or more copies of the data element in one or more DBMSs in the CPCs in sysplex 56. Moreover, this directory name also identifies a copy of the data element stored in (or about to be stored in) one of the DASDs in sysplex DASD 34 connected to DASD director 82a. The data element name is used by SES 62 to control multisystem data coherence for the data element regardless of whether the data element itself is stored in SES 62. The data element name must be registered in SES 62 for it to provide data coherence for the data element in sysplex 56. It is not necessary to store the data element itself in SES 62.

Different copies of the same database subsystem application may be running simultaneously and independently in the different CPCs of sysplex 56. These different programs may be accessing the same or different data elements or records in the same or different databases, which may simultaneously be in MS/ES local caches (LCs) of the different CPCs exemplified by LC 94 and 96 (LC-1 and LC-2) in MS 80 of CPC 58.

The executing program in any CPC (e.g., CPC 58) uses one or more allocated local cache buffers (LCBs) in the LCs (e.g., LC 94 and 96) to contain the data page and records in recent use that have been generated, backed-up, retrieved and/or stored-in by CPC 58. Any CPC in sysplex 56 may have more than one type of program currently executing on the central processors and I/O processors of that CPC. Accordingly, these plural executing programs in a CPC may have their own LCBs allocated in the local MS/ES storage area that contain their most recently accessed data elements and records. Hence, a complexity of different LCBs may be used by different types of programs and they may simultaneously exist in MS 80 or ES 84 of CPC 58, for instance. As used herein, the term local cache (LC) denominates a collection of local cache buffers (LCBs) as discussed above.

Local cache controls 92 are used by SES 62 to maintain information regarding each attached LC. SES 62 maintains sysplex-wide coherence by invalidating "stale" copies of data pages responsive to new updates of such pages registered with SES 62 by the individual CPCs. So that each CPC may determine the validity of local cache buffer data pages when access to the data pages is requested by application programming, SES provides invalidation signalling controls for cross-invalidation purposes. A CPU instruction, "define vector" (DV), is used to cause a local validation vector (LVV) to be created in the HSA associated with the LCBs within each CPC. For instance, in HSA 82, LVVs 98 and 100 each contain a single validation bit entry for each data page in LCBs 94 and 96, respectively. A new pointer entry for each new LVV is placed in the HSA table 102 (FIG. 1 C) to represent the location of the new LVV in HSA 82. The necessary LCB and T names are registered with SES 62 by CPC 58. When programming determines that data in a LCB is to be used, the CPC uses a "test vector entry" (TVE) CPU instruction to test the current state of the validity bit within the LVV for the LCB of interest. The CPC operating system can set the state of any validity bit to either a valid or invalid setting at any time by means of a CPC instruction "set vector entry" (SVE).

Entries in local cache register 90 (FIG. 1B) identify the LCs that contain copies of the data page identified by the associated directory 86 entry. Each entry in local cache register 90 provides sufficient information to locate the LVV associated with the local cache and the local cache entry within the LVV used to represent the validity of LCB data page copies. SES commands, including "read and register" (RAR) and "write and register" (WAR) cause registration of a LCB data page copy in SES directory 86. After successful registration, local cache register 90 contains sufficient information to locate all locally cached copies of the named data page in sysplex 56, including the necessary LVV information. SES command processing causes invalidation of all "stale" LCB data page copies throughout sysplex 56 responsive to a WAR command with the indication that the data page is changed received from one CPC in sysplex 56. This invalidation is accomplished by sending instructions to the individual CPCs causing each CPC to reset their corresponding LVV bit for the data page.

A CPC can use the RAR command to find if a data page is cached in SES 62 and to register its local copy. The RAR checks directory 86 for an existing assignment of the data page and registers the local CPC copy in the associated local cache register 90. SES reports back to the requesting CPC on whether the data page is cached in SES and returns the stored data page when cached. If the CPC is generating a new record or a changed record in the page, the CPC can use the WAR command to both register the updated local data page copy in register 90 and to write the updated data page into directory 86 data area. If a CPC is caching an unmodified data page in SES, the CPC should use a "write when registered" (WWR) command. Only if the registration is found and is valid is the data page then written into the entry's corresponding cache location. Recording which specific local caches contain a copy of the data page enables SES 62 to avoid sending an invalidation request signal to any local cache not containing a copy of the data page.

The cache cross-interrogate function provided through the use of a LVV as discussed above is achieved by means of the SES-cache cross-invalidation process including appropriate manipulation of the LVV bits by programming before and after the execution of specific SES commands. All necessary details of this process can be appreciated with reference to the above-incorporated Elko et al. patent application.

Application programming within the CPC is responsible for indicating the validity of the LCB data page to the associated LVV at the time interest in the LCB data page copy is registered at SES 62 (using a "set vector entry" (SVE) instruction). Because it is possible for SES 62 to receive and execute a cross-invalidate command against a designated LCB data page after interest in the data page has been registered at SES 62 but before the response to the command under which the registration took place is received, the update to the LVV entry by the DBMS must be serialized with the execution of the SES command. The DBMS must ensure the LVV entry is not set to "valid" after it has been set to "invalid" by an intervening cross-invalidate command. Otherwise, invalidation of a LCB data page may escape detection and result in loss of data integrity. Application programming should use the SVE instruction to optimistically set the LVV entry to "valid" before initiating the SES command that designates the entry for purposes of registration. Then, if command failure is noted, the SVE instruction can be used to return the LVV entry to "invalid".

The TVE command provides a high-performance means to determine LCB data page validity. To ensure that updates to the shared data page registered in SES 62 do not occur after execution of a TVE instruction shows the LCB data page copy to be valid but before the LCB copy is processed by the DBMS, serialization against modification of the SES resident data page copy must be held across the execution of the TVE instruction and the execution of subsequent transaction access to the data page in LCB. This is accomplished by global locking manager (GLM) 54. However, while this ensures data coherency across the multisystem, it introduces a separate problem for concurrent transactions within a single DBMS instance in a CPC that is solved by this invention, which is now described in connection with FIGS. 2–9.

The Invention

Figure 2:
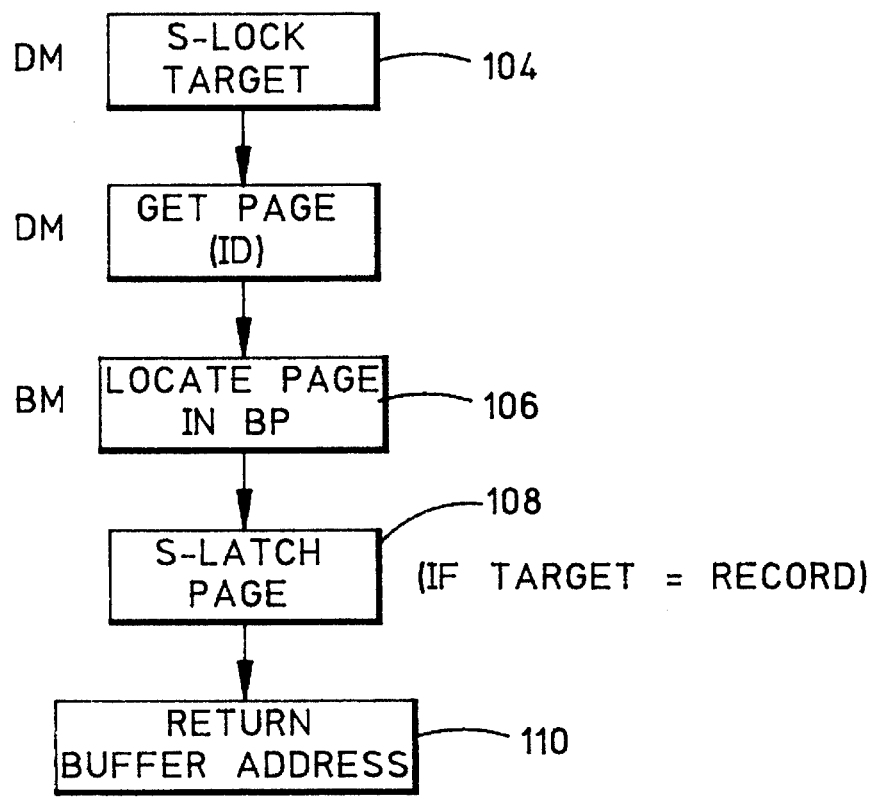
FIG. 2 is a flow chart illustrating the procedure for a cached page read operation in a single CPC system.

FIG. 2 provides a flow chart illustrating a cached-page read operation in a single system, such as CPC 58, not having any connection with other CPCs in sysplex 56. The DBMS data manager (DM) requests and receives a lock on the data page or data record in the share (S) mode. A share mode lock, as is well-known in the art, prevents changes to the page by other concurrent users but permits other users to read the page. This S-lock is issued in step 104 of FIG. 2. DM then obtains the data page identifier and passes it to the buffer manager (BM), which locates the data page in the local cache buffer pool (BP) in step 106. At this point, for record locking granularity, step 108 is necessary to provide a share-mode (S) latch on the entire data page rather than the individual record alone. Once the page is latched, the LCB location of the data page is returned to the requesting program at step 110 to permit the cache data page copy to be read in its entirety, ending the cached page read operation. Table 1 provides a pseudo-code version of this process.

TABLE 1

Figure 3:
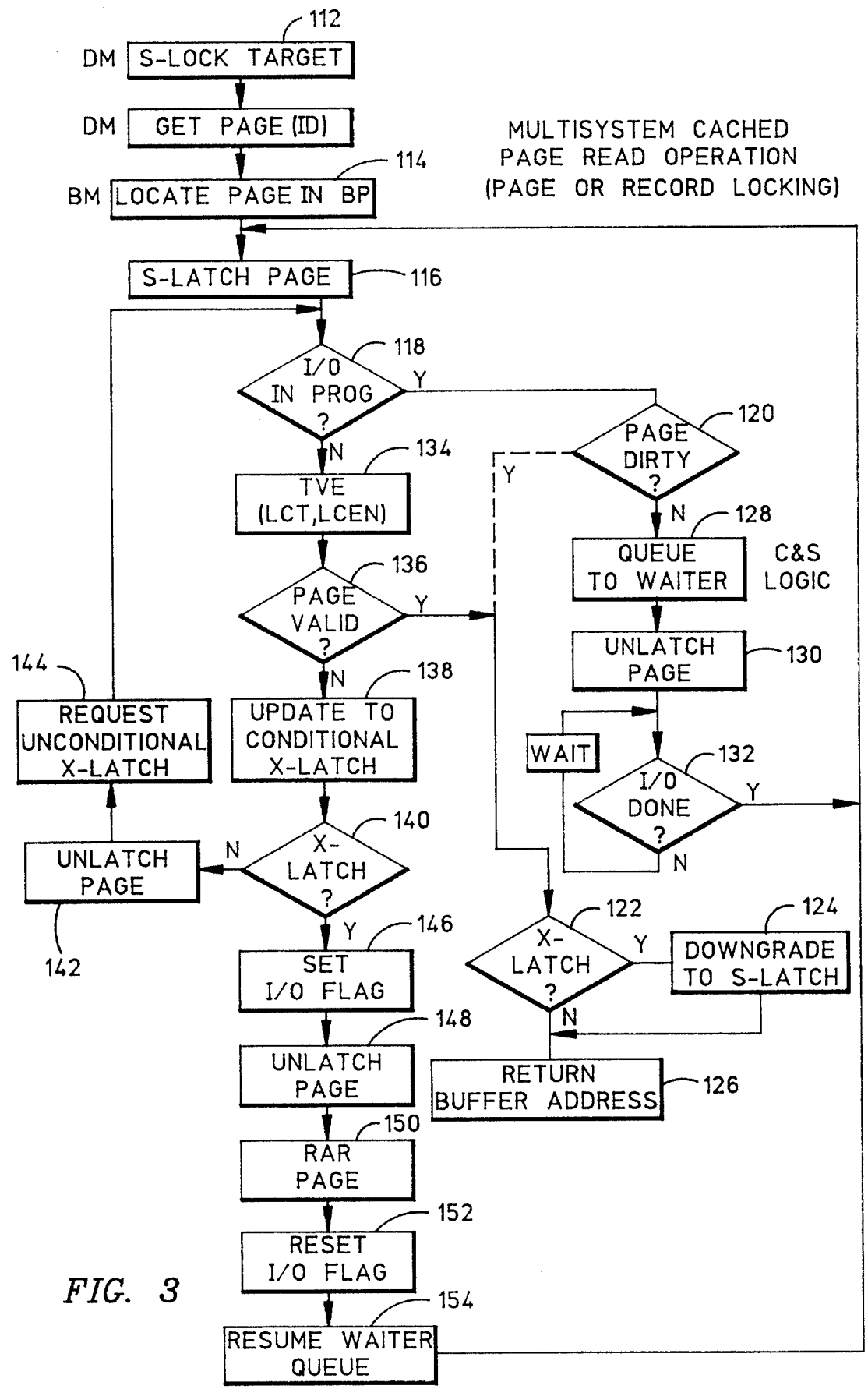
FIG. 3 is a flow chart illustrating the cached page read procedure of this invention for a multisystem environment.

- (DM) Lock page in S mode (page locking) or Lock record R in page in S mode (record locking)
- (DM) Getpage (page-id) for Read
- (BM)
  - locate page in BP
  - S latch page (not needed with page locking)
  - return buffer-address FIG. 3 provides a flow chart showing the procedure of this invention for a cached page read operation, with either page or record locking granularity, in a multisystem such as described above in connection with FIGS. 1A–1C. This invention introduces page latching together with page locking in such a multisystem shared disk environment to serialize the TVE instruction (for verifying the validity of the LCB data page copy) and the SES RAR instruction (required to obtain a current (valid) version of the LCB data page).

The flow chart in FIG. 3 begins at step 112 with a DM request for share-mode (S) lock on the target, whether page or record. As mentioned above, the S-lock permits reading but bars changing of the target data by other concurrent transactions. Following step 112, DM obtains the page identification and passes it to BM, which locates the LCB page copy in buffer pool at step 114. The remainder of this process is made necessary by the presence of other CPCs in sysplex 56 (FIG. 1B), any one of which may have updated another copy of the same data page elsewhere, unknown to the local CPC. The first step in determining the validity of the LCB data page copy is step 116, wherein the local CPC obtains a share-mode (S) latch on the data page, even when the S-lock target of step 112 is the same data page.

After obtaining the S-latch on the subject data page at step 116, the I/O-in-progress (IOP) flag within the buffer-control-block (BCB) for the associated data page is tested at step 118. If the IOP flag is set, showing page I/O in progress, the procedure then tests the Dirty Page (DP) flag in the associated BCB at step 120. Because of the atomic order of these tests in steps 118 and 120, a "yes" response in step 120 can only mean that a "dirty" page is being "forced" to stable storage. Since this now represents the "latest" valid version of the data page, the process proceeds immediately to step 122, which in combination with step 124, merely downgrades the data page latch to share-mode if necessary, and therefrom to step 126, which returns the local buffer data page address for the read I/O, thereby completing the cached page read operation.

If step 120 determines the data page to be clean, then the IOP flag of step 118 indicates that the data page is already being refreshed in local cache buffer responsive to some other transaction. Accordingly, the data page is known to be "fresh" instead of "stale", and the process proceeds by step 128 to await completion of the re-read I/O in progress, first unlatching the page step 130 and, at step 132, awaiting completion of the re-read. When the re-read is complete, step 132 returns the procedure to the beginning at step 116 substantially as shown.

If step 118 shows no I/O activity in progress, then the TVE command (microcode) is executed at step 134. If step 134 returns a bit value from the associated LVV showing the data page to be valid, then step 136 transfers control to steps 122 and 124 to downgrade to share-mode latch, if necessary, and therefrom to step 126, completing the cached page read operation.

If step 136 shows the data page to be "stale", then step 138 attempts to update the S-latch to a conditional exclusive-mode (X) latch, which, as is well-known in the art, prevents either read or write access to the data page by other concurrent transactions, if acquired. Because step 138 asks for conditional X-latch, step 140 tests to determine if the X-latch is successfully obtained. Step 140 may show failure because of pre-existing S-latches obtained by other transactions, in which case step 142 unlatches the data page S-latch obtained at step 116. Step 144 then requests an unconditional X-latch, which implies a waiting condition until all other preexisting latches are removed by their respective transactions. When the page X-latch is successfully obtained, control returns substantially as shown to step 118. Steps 118 through 138 must be repeated because changes in the IOP flag and in the LVV bit value may occur during the wait at step 144.

If step 140 shows a successful X-latch on the data page, whether obtained in step 138 or 144, the procedure then sets the IOP flag in the respective BCB at step 146. Immediately, the page is unlatched at step 148. Finally, at step 150, the RAR command is executed for the data page. This sequence is important because, if a transaction executes step 134 while the IOP flag is set to permit re-reading of the data page using the RAR command, the transaction can be mislead by the TVE result in step 134 to believe that the LCB data page copy is valid. This is because the RAR command at step 150 proceeds to: (a) set to "valid" the local LVV bit corresponding to the cached page, (b) send the RAR command to SES 62 for processing, and (c) process the response from SES 62. Until step (c) is complete, a TVE command (step 134) after step (a) completes will give a wrong answer.

After step 150, the IOP flag is reset in step 152 to signal completion of the page refresh operation and control is then returned through step 154 to step 116. Note that the IOP flag tested at step 118 may represent either a "forcing" to disk (write-I/O) or a refreshing from SES (read-I/O) by another transaction. To distinguish between the two, step 120 reviews the DP flag as discussed above. In situations where page-locking granularity is used with "force-at-commit" protocol, the branch from step 120 to step 122 cannot occur. However, this branch can occur with record-locking granularity. Also, although unnecessary for coherence with page-locking granularity, the page latch introduced to handle record-locking granularity may also be used to support unlocked-reads in a DBMS with page-locking. Table 2 below provides a pseudo-code version of the procedure of this invention discussed above in connection with FIG. 3.

TABLE 2

- (DM) Lock page S (for page locking) or Lock Record R in page (for record locking)
- ((DM) Getpage (page-id) for Read
- (BM)
  - Locate page in BP
  - Loop0
    S latch page /* to check if io-in-prog and do TVE */
  - Loop1
    If bcb.io-in-progress=yes /* Note io-in-progress and page-dirty are picked atomically from bcb*/
    - If bcb.page-dirty=yes /* if write-io going on, we can read page */
      - goto Exitok
    - Else /* Page re-read is going on */
      - put this transaction as waiter using Compare and Swap logic
      - Unlatch
      - wait for io to complete
      - Goto Loop0
    - Else /* io-in-progress = no, hold S latch */
      - TVE(LCT, LCEN)
      - If tve-rc = page-valid
      - goto Exitok
      - Else /* cached page invalid, re-read it after quiescing readers */
        - Upgrade page-latch X conditionally /* Any other tx reading page? */
        - If X latch page /* No */
          * bcb.io-in-progress=yes /* for re-read. page-dirty would be no */
          * Unlatch page
          * RAR (page-name, LCT, LCEN, ...)
          * bcb.io-in-progress=no /* io-done */
          * resume waiters
          * Go to Loop0
        - Else /* other tx's reading page, quiesce readers */
          * Unlatch /* release S latch, ask for X latch uncond. */
          * X latch page /* ask for X latch unconditionally */
          * Goto Loop1
  - Exitok
    - If X latch held, downgrade to S latch
    - return buffer address The data page may also be refreshed when the transaction needs to update a page. This is because new records may be inserted or other records updated in the same data page by other transactions between the time a single record is read by the current transaction and updated by the current transaction.

Figures 4, 5:
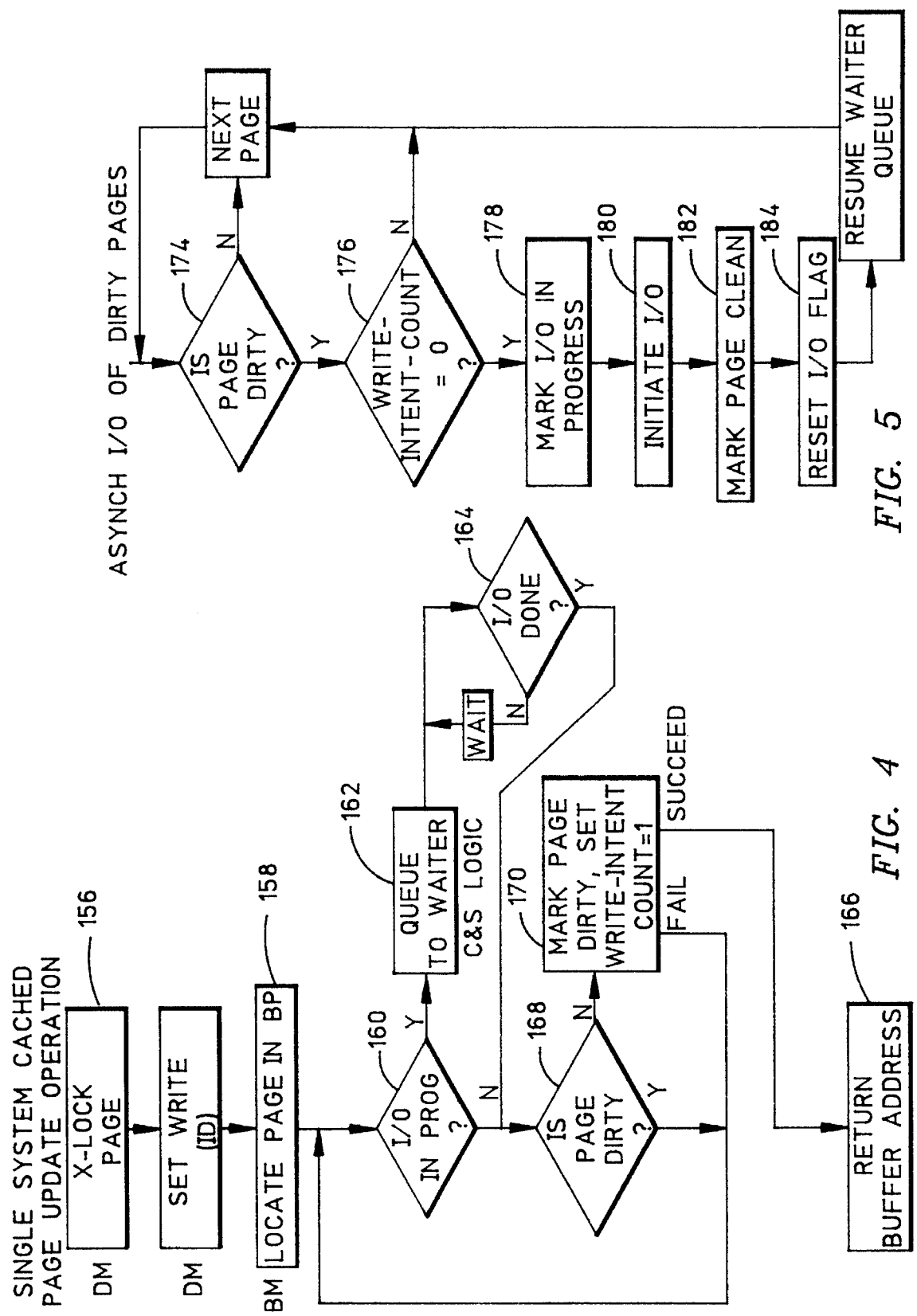
FIG. 4 is a flow chart illustrating a cached page update procedure for a single CPC system.
FIG. 5 is a flow chart illustrating an asynchronous destaging procedure for a single CPC system.

The multisystem data page updating procedure of this invention can be best appreciated by first considering two single system update procedures used for page and record-locking granularities, which are now described. FIG. 4 shows a flow chart for the procedure necessary to update a LCB page in a single system such as CPC 58 (FIG. 1B) having no connection to either a SES or other CPCs. The procedure begins by obtaining a lock in exclusive mode (X-lock) for the subject data page at step 156. DM then executes a SetWrite instruction to provide the LCB data page ID to step 158, wherein Buffer Manager locates the page in the buffer pool. Once located, the IOP flag in the data page BCB is tested at step 160 and, if I/O is found to be in progress, the procedure assumes that the page is no longer dirty and, after awaiting completion of the I/O at steps 162 and 164, passes directly to step 166, returning the buffer address for the update to enable completion of the cached page update operation.

If there is no I/O found to be in progress at step 160, then the DP flag in the page BCB is checked at step 168 and, if not already dirty, the page is marked dirty at step 170. After setting the DP flag, the "write-intent-count" field in the data page BCB is incremented by step 172. If the write-intent-count setting instruction fails at step 172, then the control returns to step 160 substantially as shown. If step 172 succeeds, then step 166 is executed, completing the process. Table 3 provides a pseudo-code version of the procedure illustrated in FIG. 4.

The SetWrite protocol announces DM's intent of updating the page. Only a subset of the SetWrite is relevant to this discussion. The main difference between the update procedure in FIG. 4 and the read procedure in FIG. 2 is that the transaction is waited until completion of I/O if the write-I/O is in progress. For page locking, this is accomplished with the write-intent-count and the IOP flag fields of the data page BCB. The (write-intent-count>0) and (IOP flag=set) are mutually exclusive states of the data page and are manipulated by Compare and Swap logic. Also, an I/O in progress at step 160 represents the forced write of an already-changed (dirty) page. Such I/O is initiated as a result of asynchronous (batched) writes in a single system only if the "no-force-at-commit" protocol is used, as in the DB2 system, for instance.

With page locking, because there is only one system updating the page, there is no need for page latching to serialize concurrent updaters and readers in FIG. 4. However, as discussed below in connection with FIG. 6, such latching is required for record-locking granularity.

After the update in FIG. 4 (and Table 3) has completed, DM issues the ResetWrite command, resetting the write-intent-count in the data page BCB to zero by means of Compare and Swap logic.

The write I/Os for the pages of a database are initiated asynchronously as shown in FIG. 5. Beginning at step 174, the DP flag in BCB is tested to determine whether the page is dirty. If the page is not dirty, then nothing is done and the next page is examined at step 174, substantially as shown. If the page is dirty, then the write-intent-count field in BCB is tested for equality to zero and, if not zero, the page is ignored because updates are in progress for that page. If step 176 finds the write-intent-count field to be zero, then the IOP flag is set in BCB by step 178 and the page is forced to stable storage at step 180. After saving the page, the DP flag is reset in step 182 and the IOP flag is also reset at step 184, which completes the "externalizing" of that page. The procedure then considers the next page in the batch queue. Table 4 provides a pseudo-code example of the procedure discussed above in connection with FIG. 5.

TABLE 4

- if (bcb.write-intent-count = 0)
  - mark bcb.io-in-progress = yes
  - initiate io

TABLE 3

- (DM) Lock page in X mode (for update)
- (DM) SetWrite (page-id) for Update
- (BM)
  - Locate page in BP
  - Loop1
    If bcb.io-in-progress = yes /* because of previous update to page */
    - put this transaction as waiter using Compare and Swap (CS) logic
    - wait for io to complete
  - if bcb.page-dirty = no /* is page clean? */
    - (bcb.page-dirty = yes,write-intent-count=1) via Compare and Swap logic /*yes,mark it dirty */
  - Else /* page is already dirty */
    - (bcb.write-intent-count = 1) via Compare and Swap logic
  - If Compare and Swap fails .
    - Goto Loop1
  - Else.
  Return buffer address TABLE 4-continued

- mark (bcb.page-dirty = no, bcb.io-in-progress = no)
- resume waiters
- Else. /* I/O may be initiated in subsequent batch */

Figure 6:
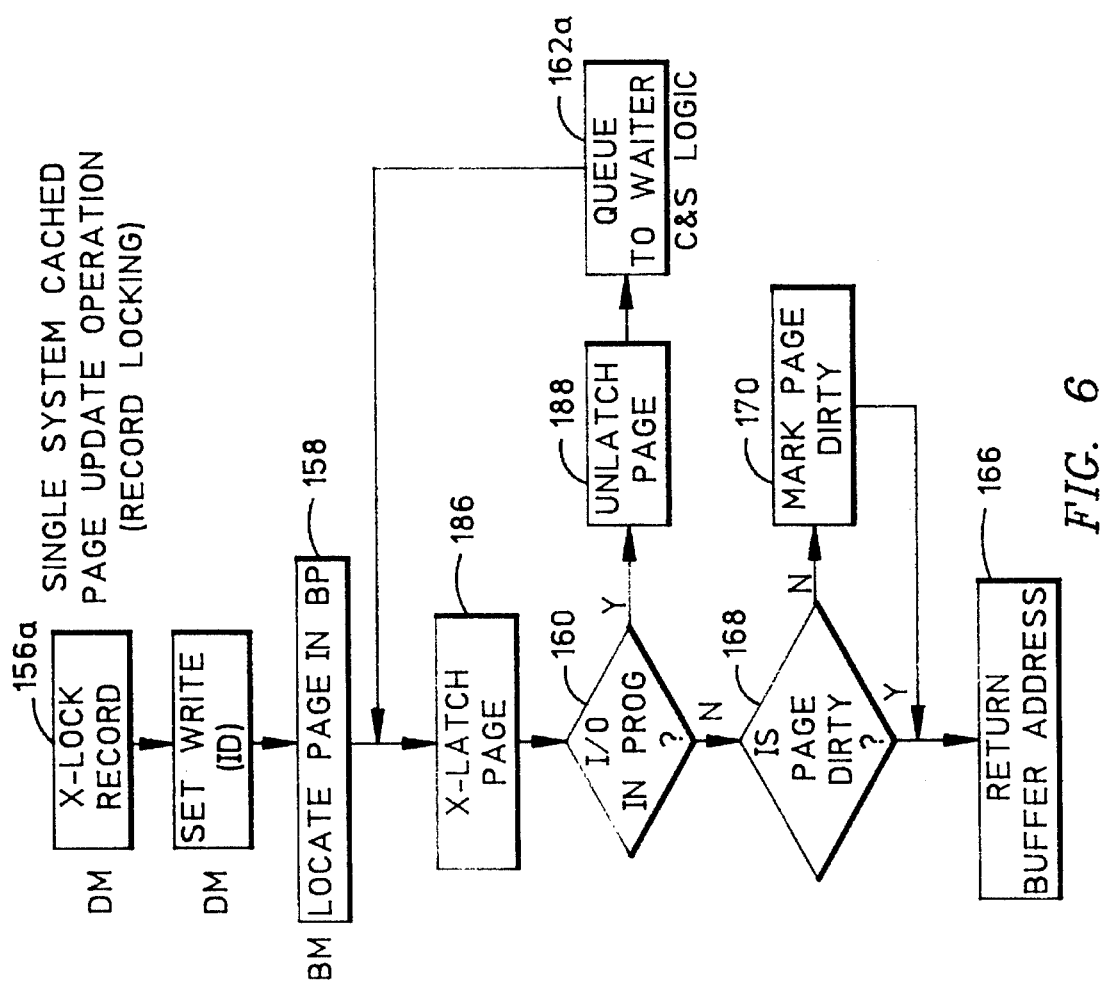
FIG. 6 is a flow chart illustrating a cached page update procedure using record locking granularity for a single CPC system.

With record-locking granularity, page latches are required to serialize concurrent updaters and readers even in a single system, as shown in FIG. 6. In FIG. 6, DM obtains an X-lock on the target record in step 156*a*. Except for the page latching step 186 and unlatching step 188, the remainder of the procedure is substantially as discussed above in connection with FIG. 4 for the page-locking granularity case in a single system. Note that when I/O is found to be in progress at step 160, the data page is unlatched at step 188 and put in the waiter queue at step 162*a*. Instead of proceeding to step 166, step 162*a* returns to step 186 to obtain the requisite X-latch on the data page. Table 5 provides a pseudo-code example of the procedure discussed above in connection with FIG. 6.

TABLE 5

- (DM) Lock record R in X mode in page (for update)
- (DM) SetWrite (page-id) for Update with X latch
  Upon return from BM, transaction would have an X latch on the page
- (BM)
  - Locate page in BP
  - Loop0
    X latch page
  - If bcb.io-in-progress yes /* because of previous update to page */
    - Unlatch page
    - put this transaction as waiter using Compare and Swap logic
    - Goto Loop0
  - Else
  - if bcb.page-dirty = no
    - mark bcb.page-dirty = yes
  - Else.
  - Return buffer address

---

Figure 7:
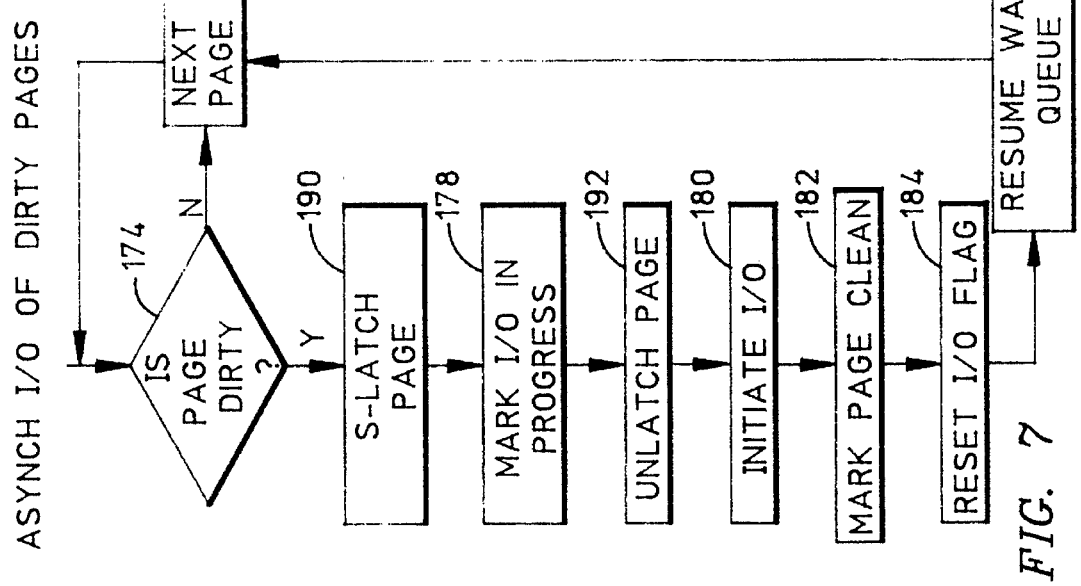
FIG. 7 is a flow chart illustrating an asynchronous destaging procedure for a single CPC system with record-level locking granularity.

Similarly to the above discussion in connection with FIG. 5 for page-locking granularities, after the record update is accomplished, DM unlatches the data page (analogous to zeroing the write-intent-count field in BCB for the page-locking granularity case in FIG. 5). FIG. 7 shows the procedure used to "externalize" data pages to stable storage with record-locking granularity. Note that the procedure in FIG. 7 is substantially the same as the procedure discussed above for page-locking granularity in connection with FIG. 5 except for the use of a share-mode page latch at step 190 instead of the write-intent-count field test in step 176. Step 192 is added to unlatch the page after the IOP flag in BCB is set in step 178 of FIG. 7. Table 6 provides a pseudo-code example of the procedure discussed above in connection with FIG. 7.

TABLE 6

- S latch page
- mark bcb.io-in-progress = yes
- Unlatch page
- initiate io
- mark (bcb.page-dirty = no, bcb.io-in-progress = no)
- resume waiters

---

FIG. 8 presents a flow chart illustrating the multisystem cached page update operation of this invention for either page or record-locking granularities. As with the single system case, DM first obtains an exclusive mode lock on the target at step 194. This X-lock may be obtained by using GLM 54 (FIG. 1A) to serialize across all DBMS instances in sysplex 56. After obtaining the page identifier, DM passes it to BM, which locates the page in buffer pool at step 196.

In the multisystem cached page read operation discussed above in connection with FIG. 3, page latching is introduced even when page-locking granularity is used. This permits use of a single procedure in support of either page-locking or record-locking protocol for the database. The use of latching also supports unlocked (latched) page reads. Now, for the update case, page latching is also advantageous because it eliminates any need to use the write-intent-count field in the data page BCB with page-locking granularity. This is because the page latch provides serialization between an updating transaction and the "externalizing" of the page to stable storage. Thus, this invention also provides a single procedure for updating a page to support either page-locking or record-locking granularity.

Accordingly, although the X-latching step 198 in FIG. 8 is only strictly necessary when record-locking granularity is used in DM, it is preferred that step 198 be incorporated for both locking granularities.

After latching the data page in step 198, the IOP flag in BCB is tested in step 200. If there is I/O in progress, the data page is queued to a waiter at step 202 and unlatched at step 204 until completion of the I/O, whereupon control is returned to step 198 substantially as shown. If step 200 finds no I/O in progress, then step 206 executes the Test Vector Entry (TVE) command to determine from the LVV bit entry whether the data page is valid. If the data page is valid, then step 208 proceeds to step 209, which marks the page dirty if it isn't already, and therefrom to step 212, permitting completion of the return of a valid cached page for update operation, with X-latch held by the transaction.

If step 208 finds the data page to be invalid, then step 210 sets the IOP flag in BCB and step 212 unlatches the data page X-latch obtained in step 198 preparatory to execution of the read-and-register (RAR) instruction for the "stale" data page at step 214. After completion of the data page "refresh" in step 214, the IOP flag is reset at step 216 and the process resumes the waiter queue and proceeds to step 198 substantially as shown. After the update has completed, DM unlocks the data page. Table 7 provides a pseudo-code example of the procedure discussed above in connection with FIG. 8.

TABLE 7

- (DM) Lock page X (for page locking) or Lock Record X (for record locking) in page
- (DM) SetWrite (page-id) for update
  In the logic shown below, page latch would be held when Setwrite returns. With page locking,
  page latch is not needed and is only a minor variation to the logic below.
- (BM)
  - Locate page in BP
  - Loop0
    X latch page /* to check if io-in-prog and do TVE */
  - Loop1
    If bcb.io-in-progress=yes/*Note io-in-progress and page-dirty are picked atomically from bcb*/

TABLE 7-continued

Figure 9:
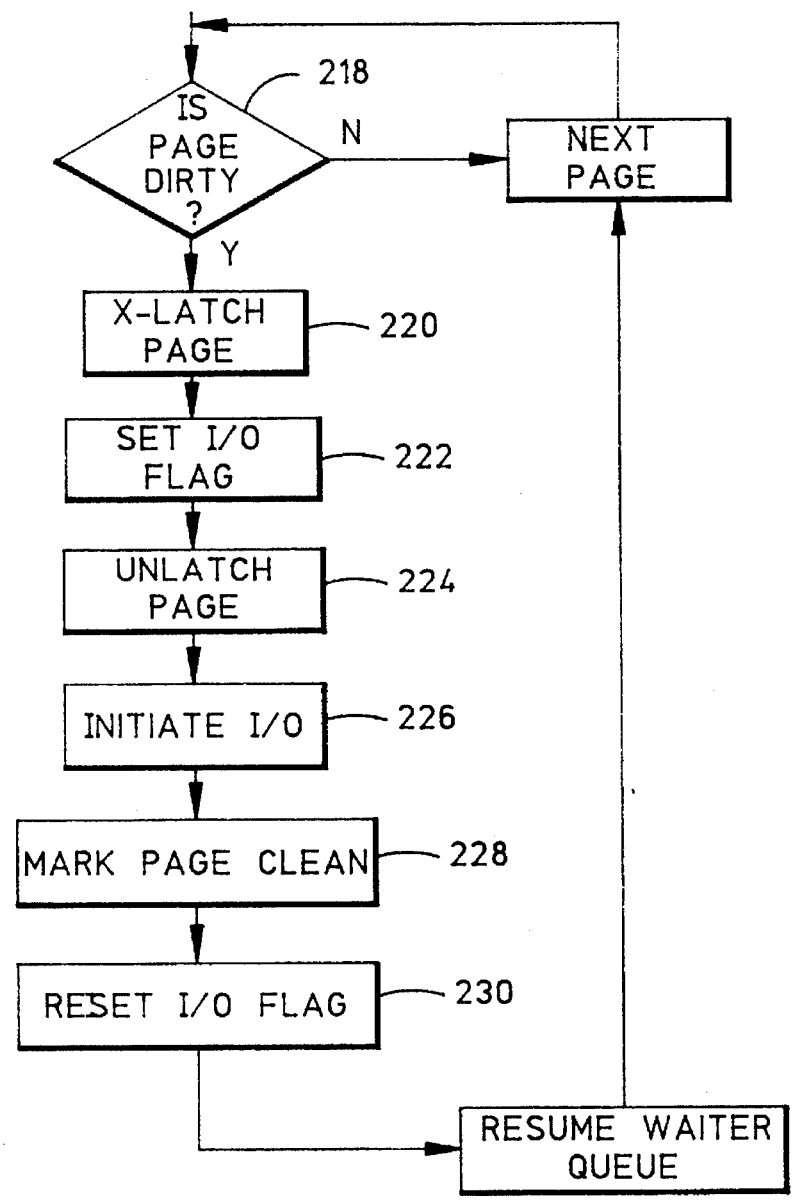
FIG. 9 is a flow chart illustrating an asynchronous destaging procedure for a multisystem environment.

- put this transaction as waiter using Compare and Swap logic
- Unlatch
- wait for io to complete
- Goto Loop0
  /* io-in-progress = no, X page latch held */
- TVE(LCT, LCEN)
- If tve-rc = page-valid
- Goto Exitok
- Else /* cached page is invalid, re-read it */
- bcb.io-in-progress = yes /* for re-read, page-dirty would be no */
- Unlatch page
- RAR (page-name, LCT, LCEN, ...)
- bcb.io-in-progress = /* no io-done */
- resume waiters
- Go to Loop0
- Exitok
  if bcb.page-dirty = no /* if page is clean */
  - mark bcb.page-dirty yes /* mark it dirty */
- Else
- Return buffer address The write I/Os for the data pages are asynchronously initiated as shown in FIG. 9. The major difference between single system asynchronous I/O of dirty pages (FIGS. 5 and 7) and the multisystem procedure of this invention is the X-latch used to mark I/O in progress in the multisystem case, thereby serializing against possible TVE commands performed under S-latch by concurrent read transactions. However, as shown in FIG. 3, a read transaction may read the data page for which a write-I/O is in progress after the X-latch is released. The procedure in FIG. 9 begins at step 218 by verifying that the data page is dirty and proceeding to the next page if not. If the page is dirty, then the system obtains an X-latch on the data page at step 220. After successful X-latch, the IOP flag is set in BCB at step 222 and the page X-latch obtained in step 220 is removed at step 224. The "externalizing" write is initiated in step 226 and, when complete, the data page is marked clean by resetting the DP flag in BCB at step 228. Finally, the IOP flag is reset in BCB at step 230 and, after resuming the waiter queue, the procedure returns to step 218 for the next page. Table 8 provides a pseudo-code example of the procedure shown in FIG. 9.

TABLE 8

- X latch page
- mark bcb.io-in-progress = yes
- Unlatch page
- initiate write-io, e.g., WAR (page-name, LCT, LCEN, ...)
- mark (bcb.page-dirty = no, bcb.io-in-progress = no)
- resume waiters SES 62 (FIGS. 1A–1C) offers efficient control of data coherency for data pages in a multisystem shared disk environment, particularly for a database that has intersystem read-write interest. The procedures of this invention provide an efficient method for using a microcode TVE command by a DBMS to check LVVs to verify that the LCB page copy is valid, and if it is not, a second efficient procedure for refreshing the data page from SES 62 using the RAR command discussed above. This invention solves the problems arising from the disadvantageous burden imposed on application software for serialization of the validity-verification and page-refreshing operations in the sysplex environment discussed above. The procedure of this invention distinguishes between read-I/O-in-progress and write-I/O-in-progress because a read transaction can use the LCB data page copy when a write-I/O is in progress without having to issue a TVE request to verify page validity. Finally, for page-locking granularity, the IOP flag in BCB is used differently in the multisystem than for a single system because a share-mode page latch is alone sufficient for serializing concurrent transactions in the single LCB of a single system. In the multiuser environment, an exclusive-mode page latch is necessary for complete serialization of all concurrent transactions, which are attempting access to the same page.

While this invention is primarily discussed as a procedure, it may be understood by a person of ordinary skill in the art that an apparatus, such as the conventional data processor disclosed in FIG. 1A, could be programmed or otherwise designed to facilitate the practice of the procedure of this invention. Such a processor would include appropriate program means for executing the procedure of this invention. Also, an article of manufacture, such as a pre-recorded floppy disk or similar computer program product, for use with a data processing system, could include a storage medium and program means recorded thereon for directing the data processing system of FIG. 1A to facilitate the practice of the procedure of this invention. It may be easily understood that such apparatus and articles of manufacture also fall within the spirit and scope of this invention.

Clearly, other embodiments and modifications of this invention will occur readily to those of ordinary skill in the art in view of these teachings. Therefore, this invention is to be limited by the following claims, which include all such embodiments and modifications when viewed in conjunction with the above specification and accompanying drawing.

We claim:

1. In a data processing system having a plurality of database management systems (DBMSs) each having a local cache buffer (LCB) for storing data pages each having a plurality of records for processing by transactions, said DBMSs being coupled to a Shared Electronic Store (SES) and a shared external store for stable storage of one or more databases, each said DBMS also having first means for storing a local validation vector (LVV) containing validity information for each said data page in said LCB and having second means for storing a buffer control block (BCB) for each said data page in said LCB, each BCB including an Input-Output-in-Progress (IOP) flag indicating when set that Input/Output (I/O) activity exists for the corresponding said data page, wherein said DBMS has Read-And-Register (RAR) means for refreshing an invalid first data page in said LCB, said RAR means operating to first reset the corresponding said LVV information to show validity of said first data page and secondly copying a valid version of said first data page from said SES to said LCB, a method to ensure data coherency by serializing the testing of said LVV for validity of a first said data page in said LCB and the reading by a transaction of said first data page from said LCB, said method comprising the steps of:

(a) latching said first data page with a share (S) mode latch;

(b) testing said LVV to determine the validity of said first data page; and (c) responsive to finding said first data page to be invalid, performing the ordered steps of:

(c.1) latching said first data page with an exclusive (X) mode latch, (c.2) setting said IOP flag in said BCB for said first data page, (c.3) unlatching said first data page, (c.4) replacing said first data page in said LCB with a valid copy through said RAR means, and (c.5) resetting said IOP flag in said BCB for said first data page.

2. The method of claim 1 wherein said latching step (c.1) comprises the steps of:

(c.1.1) requesting a conditional exclusive (X) latch for said first data page;

(c.1.2) responsive to rejection of said conditional X-latch because of a pre-existing latch on said first data page, performing the steps of:

(c.1.2.1) removing from said first data page said S-latch obtained in said latching step (a), (c.1.2.2) requesting an unconditional exclusive (X) latch for said first data page, and (c.1.2.3) responsive to receiving said unconditional X-latch, repeating said testing step (b) and said performing step (c).

3. In a data processing system having a plurality of database management systems (DBMSs) each having a local cache buffer (LCB) for storing data pages each having a plurality of records for processing by transactions, said DBMS being coupled to a global locking manager (GLM) for locking said data pages and said records, and being coupled to a Shared Electronic Store (SES) and to a shared external store for stable storage of one or more databases, each said DBMS also having first means for storing a Local Validity Vector (LVV) containing validity information for each said data page in said LCB and having second means for storing a Buffer Control Block (BCB) for each said data page in LCB, each said BCB including an Input-Output-in-Progress (IOP) flag indicating when set that Input/Output (I/O) activity exists for the corresponding said data page and a Dirty Page (DP) flag indicating when set that the corresponding said data page includes record modifications not yet written to stable storage, a method for maintaining database coherency during the reading by a transaction of at least one record in a first data page in one said LCB, said method comprising the steps of:

(a) locking said at least one record in said first data page in share (S) mode;

(b) latching said first data page with a share (S) mode latch;

(c) if said IOP flag for said first page is set, performing the steps of:

(c.1) if said DP flag for said first data page is set, skipping to and performing reading step (e), otherwise (c.2) performing the steps of:

(c.2.1) unlatching said first data page, and (c.2.2) responsive to reset of said IOP flag for said first data page, repeating said latching step (b) and said performing step (c);

otherwise (d) performing the steps of:

(d.1) testing said LVV to determine validity of said first data page, and (d.2) if said LVV shows said first data page to be valid, skipping to and performing reading step (e), otherwise performing the steps of:

(d.2.1) latching said first data page with an exclusive (X) mode latch, (d.2.2) setting said IOP flag in said BCB for said first data page, (d.2.3) unlatching said first data page, (d.2.4) replacing said first data page in said LCB with a valid copy of said first data page from said SES, (d.2.5) resetting said IOP flag in said BCB for said first data page, and (d.2.6) repeating said steps (b) through (d); and (e) reading said at least one record from said first data page in said LCB.

4. The method of claim 3 wherein said latching step (d.2.1) comprises the steps of:

(d.2.1.1) requesting a conditional exclusive (X) latch for said first data page;

(d.2.1.2) responsive to a preexisting latch by another process on said first data page, performing the steps of:

(d.2.1.2.1) removing from said first data page said S-latch obtained in said latching step (b), (d.2.1.2.2) requesting an unconditional exclusive (X) latch for said first data page, and (d.2.1.2.3) responsive to receiving said unconditional X-latch, repeating said performing step (d).

5. The method of claim 4 wherein said reading step (e) comprises the step of:

(e.1) if said first data page is latched in exclusive (X) mode, downgrading said first data page latch to share (S) mode.

6. The method of claim 3 wherein said locking step (a) is performed for all of said first data page.

7. The method of claim 6 wherein said latching step (d.2.1) comprises the steps of:

(d.2.1.1) requesting a conditional exclusive (X) latch for said first data page;

(d.2.1.2) responsive to a preexisting latch by another process on said first data page, performing the steps of:

(d.2.1.2.1) removing from said first data page said S-latch obtained in said latching step (b), (d.2.1.2.2) requesting an unconditional exclusive (X) latch for said first data page, and (d.2.1.2.3) responsive to receiving said unconditional X-latch, repeating said performing step (d).

8. The method of claim 7 wherein said reading step (e) comprises the step of:

(e.1) if said first data page is latched in exclusive (X) mode, downgrading said first data page latch to share (S) mode.

9. In a data processing system having a plurality of database management systems (DBMSs) each having a local cache buffer (LCB) for storing data pages each having a plurality of records for processing by transactions, said DBMSs being coupled to a Shared Electronic Store (SES)

and a shared external store for stable storage of one or more databases, each said DBMS also having first means for storing a local validation vector (LVV) containing validity information for each said data page in said LCB and having second means for storing a buffer control block (BCB) for each said data page in said LCB, each BCB including an Input-Output-in-Progress (IOP) flag indicating when set that Input/Output (I/O) activity exists for the corresponding said data page, wherein said DBMS has Read-And-Register (RAR) means for refreshing an invalid first data page in said LCB, said RAR means operating to first reset the corresponding said LVV information to show validity of said first data page and secondly copying a valid version of said first data page from said SES to said LCB, a method to ensure data coherency by serializing the testing of said LVV for validity of a first said data page in said LCB and the updating by a transaction of said first data page in said LCB, said method comprising the steps of:

(a) latching said first data page with an exclusive (X) mode latch;

(b) testing said LVV to determine the validity of said first data page; and (c) responsive to finding said first data page to be invalid, performing the ordered steps of:
- (c.1) setting said IOP flag in said BCB for said first data page,
- (c.2) unlatching said first data page,
- (c.3) replacing said first data page in said LCB with a valid copy through said RAR means, and
- (c.4) resetting said IOP flag in said BCB for said first data page.

10. In a data processing system having a plurality of database management systems (DBMSs) each having a local cache buffer (LCB) for storing data pages each having a plurality of records for processing by transactions, said DBMS being coupled to a global locking manager (GLM) for locking said data pages and said records, and being coupled to a Shared Electronic Store (SES) and to a shared external store for stable storage of one or more databases, each said DBMS also having first means for storing a Local Validity Vector (LVV) containing validity information for each said data page in said LCB and having second means for storing a Buffer Control Block (BCB) for each said data page in LCB, each said BCB including an Input-Output-in-Progress (IOP) flag indicating when set that Input/Output (I/O) activity exists for the corresponding said data page and a Dirty Page (DP) flag indicating when set that the corresponding said data page includes record modifications not yet written to stable storage, a method for maintaining database coherency during the updating by a transaction of at least one record in a first data page in said LCB of one said DBMS, said method comprising the steps of:

(a) locking said at least one record in said first data page in exclusive (X) mode;

(b) latching said first data page with an exclusive (X) mode latch;

(c) if said IOP flag for said first data page is set, performing the steps of:
- (c.1) unlatching said first data page, and
- (c.2) responsive to reset of said IOP flag for said first data page, repeating said latching step (b) and said performing step (c); otherwise (d) performing the steps of:
- (d.1) testing said LVV to determine validity of said first data page, and
- (d.2) if said LVV shows said first data page to be invalid, performing the steps of:
  - (d.2.1) latching said first data page with an exclusive (X) mode latch,
  - (d.2.2) setting said IOP flag in said BCB for said first data page,
  - (d.2.3) unlatching said first data page,
  - (d.2.4) replacing said first data page in said LCB with a valid copy of said first data page from said SES,
  - (d.2.5) resetting said IOP flag in said BCB for said first data page, and
  - (d.2.6) repeating said steps (b) through (d); otherwise (e) setting said DP flag for said first data page if not already set; and (f) writing an update to said at least one record in said first data page in said LCB.

11. The method of claim 10 wherein said locking step (a) is performed for all of said first data page.

12. A computer program product, for use with a data processing system having a plurality of database management systems (DBMSs) each having a local cache buffer (LCB) for storing data pages each having a plurality of records for processing by transactions, said DBMSs being coupled to a Shared Electronic Store (SES) and a shared external store for stable storage of one or more databases, each said DBMS also having first means for storing a local validation vector (LVV) containing validity information for each said data page in said LCB and having second means for storing a buffer control block (BCB) for each said data page in said LCB, each BCB including an Input-Output-in-Progress (IOP) flag indicating when set that Input/Output (I/O) activity exists for the corresponding said data page, wherein each said DBMS has Read-And-Register (RAR) means for refreshing an invalid first data page in said LCB, said RAR means operating to first reset the corresponding said LVV information to show validity of said first data page and secondly copying a valid version of said first data page from said SES to said LCB, said computer program product comprising:

a recording medium;

means, recorded on said recording medium, for directing said data processing system to latch said first data page with a share (S) mode latch;

means, recorded on said recording medium, for directing said data processing system to test said LVV to determine the validity of said first data page; and means, recorded on said recording medium, for:
said data processing system to perform, responsive to finding
latching said first data page with an exclusive (X) mode latch,
setting said IOP flag in said BCB for said first data page,
unlatching said first data page,
replacing said first data page in said LCB with a valid copy through said RAR means, and
resetting said IOP flag in said BCB for said first data page.

13. A computer program product for use with a data processing system having a plurality of database management systems (DBMSs) each having a local cache buffer (LCB) for storing data pages each having a plurality of records for processing by transactions, said DBMS being coupled to a global locking manager (GLM) for locking said data pages and said records, and being coupled to a Shared Electronic Store (SES) and to a shared external store for stable storage of one or more databases, each said DBMS also having first means for storing a Local Validity Vector (LVV) containing validity information for each said data page in said LCB and having second means for storing a Buffer Control Block (BCB) for each said data page in LCB, each said BCB including an Input-Output-in-Progress (IOP) flag indicating when set that Input/Output (I/O) activity exists for the corresponding said data page and a Dirty Page (DP) flag indicating when set that the corresponding said data page includes record modifications not yet written to stable storage, said data program product comprising:

a recording medium;

means, recorded on said recording medium, for directing said data processing system to lock said at least one record in said first data page in share (S) mode;

means, recorded on said recording medium, for directing said data processing system to latch said first data page with a share (S) mode latch;

means, recorded on said recording medium, for unlatching said first data page, and responsive to reset of said IOP flag for said first data page, latching said first page with a share (S) mode latch, if said IOP flag for said first data page is set and said DP flag for said first data page is set;

means, recorded on said recording medium, for, testing said LVV to determine validity of said first data page and for latching said first data page with an exclusive (X) mode latch, setting said IOP flag in said BCB for said first data page, unlatching said first data page, replacing said first data page in said LCB with a valid copy of said first data page from said SES, and resetting said IOP flag in said BCB for said first data page, if said LVV shows said first data page to invalid; and means, recorded on said recording medium, for directing said data processing system to read said at least one record from said first data page in said LCB.

14. A computer program product, for use with a data processing system having a plurality of database management systems (DBMSs) each having a local cache buffer (LCB) for storing data pages each having a plurality of records for processing by transactions, said DBMSs being coupled to a Shared Electronic Store (SES) and a shared external store for stable storage of one or more databases, each said DBMS also having first means for storing a local validation vector (LVV) containing validity information for each said data page in said LCB and having second means for storing a buffer control block (BCB) for each said data page in said LCB, each BCB including an Input-Output-in-Progress (IOP) flag indicating when set that Input/Output (I/O) activity exists for the corresponding said data page, wherein said DBMS has Read-And-Register (RAR) means for refreshing an invalid first data page in said LCB, said RAR means operating to first reset the corresponding said LVV information to show validity of said first data page and secondly copying a valid version of said first data page from said SES to said LCB, said computer program product comprising:

a recording medium;

means, recorded on said recording medium, for directing said data processing system to latch said first data page with an exclusive (X) mode latch;

means, recorded on said recording medium, for directing said data processing system to test said LVV to determine the validity of said first data page; and means, recorded on said recording medium, responsive to finding said first data page to be invalid, for:
    setting said IOP flag in said BCB for said first data page,
    unlatching said first data page,
    replacing said first data page in said LCB with a valid copy through said RAR means, and
    resetting said IOP flag in said BCB for said first data page, 15. A computer program product, for use with a data processing system having a plurality of database management systems (DBMSs) each having a local cache buffer (LCB) for storing data pages each having a plurality of records for processing by transactions, said DBMS being coupled to a global locking manager (GLM) for locking said data pages and said records, and being coupled to a Shared Electronic Store (SES) and to a shared external store for stable storage of one or more databases, each said DBMS also having first means for storing a Local Validity Vector (LVV) containing validity information for each said data page in said LCB and having second means for storing a Buffer Control Block (BCB) for each said data page in LCB, each said BCB including an Input-Output-in-Progress (IOP) flag indicating when set that Input/Output (I/O) activity exists for the corresponding said data page and a Dirty Page (DP) flag indicating when set that the corresponding said data page includes record modifications not yet written to stable storage, said computer program product comprising:

means, recorded on said recording medium, for directing said data processing system to lock said at least one record in said first data page in exclusive (X) mode;

means, recorded on said recording medium, for directing said data processing system to latch said first data page with an exclusive (X) mode latch;

means, recorded on said recording medium, for directing said data processing system to unlatch said first data page if said IOP flag for said first data page is set;

means, recorded on said recording medium, for directing said data processing system to:
    (a) test said LVV to determine validity of said first data page, and
    (b) latch said first data page with an exclusive (X) mode latch, set said IOP flag in said BCB for said first data page, unlatch said first data page, replace said first data page in said LCB with a valid copy of said first data page from said SES, and reset said IOP flag in said BCB for said first data page, if said LVV shows said first data page to be invalid;

means, recorded on said recording medium, for directing said data processing system to set said DP flag for said first data page if not already set; and means, recorded on said recording medium, for directing said data processing system to write an update to said at least one record in said first data page in said LCB.

* * * * *